(12) United States Patent
Ikeda et al.

(10) Patent No.: US 12,087,988 B2
(45) Date of Patent: Sep. 10, 2024

(54) WIRING BOARD

(71) Applicant: DAIKIN INDUSTRIES, LTD., Osaka (JP)

(72) Inventors: Tomohiro Ikeda, Osaka (JP); Hiroyuki Yoshimoto, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 492 days.

(21) Appl. No.: 17/381,681

(22) Filed: Jul. 21, 2021

(65) Prior Publication Data

US 2021/0359386 A1 Nov. 18, 2021

Related U.S. Application Data

(63) Continuation of application No. PCT/JP2020/003447, filed on Jan. 30, 2020.

(30) Foreign Application Priority Data

Feb. 1, 2019 (JP) ................................ 2019-017362

(51) Int. Cl.
| | |
|---|---|
| *H01P 3/16* | (2006.01) |
| *C08J 7/04* | (2020.01) |
| *H01P 3/00* | (2006.01) |
| *H01P 3/10* | (2006.01) |

(52) U.S. Cl.
CPC ............. *H01P 3/16* (2013.01); *C08J 7/0427* (2020.01); *H01P 3/00* (2013.01); *H01P 3/10* (2013.01); *C08J 2327/18* (2013.01); *C08J 2427/18* (2013.01)

(58) Field of Classification Search
CPC .. H01P 1/2002; H01P 3/00; H01P 3/10; H01P 3/16; H01P 3/165
USPC .......................... 333/157, 208, 209, 239, 248
See application file for complete search history.

(56) References Cited

U.S. PATENT DOCUMENTS

| | | |
|---|---|---|
| 2016/0240907 A1 | 8/2016 | Haroun |
| 2018/0040936 A1 | 2/2018 | Yoshimoto et al. |

FOREIGN PATENT DOCUMENTS

| | | |
|---|---|---|
| JP | 61-066730 A | 4/1986 |
| JP | 10-163964 A | 6/1998 |
| JP | 11-186818 A | 7/1999 |
| WO | 2016/159314 A1 | 10/2016 |

OTHER PUBLICATIONS

Bradley Givot et al., "Accurate Measurements of Permittivity and Dielectric Loss Tangent of Low Loss Dielectrics at Frequency Range 100 Mhz-20 Ghz," International Conference on Microwaves, Radar & Wireless Communications, 2006 (5 pages total).
International Preliminary Report on Patentability dated Jul. 27, 2021 with a Translation of the Written Opinion of the International Searching Authority in Application No. PCT/JP2020/003447.
(Continued)

*Primary Examiner* — Rakesh B Patel
(74) *Attorney, Agent, or Firm* — Sughrue Mion, PLLC

(57) ABSTRACT

A wiring board including a dielectric line containing a resin (A), and a dielectric exterior covering the dielectric line and containing a resin (B). The dielectric exterior has a relative permittivity lower than a relative permittivity of the dielectric line at 6 GHz and 25° C.

21 Claims, 6 Drawing Sheets

(56) References Cited

OTHER PUBLICATIONS

"Characteristics of Fluororesin," Web page http://www.seal.valqua.co.ip/en/fp_property/fluoroplastics_characteristic/, Jul. 20, 2021, retrieved from Internet Archive Wayback Machine <https://web.archive.org/web/2019010100 00 00 */http://www.seal.valqua.co.jp/en/fp_property/fluoroplastics_characteristic/>, Jan. 16, 2019, 3pages.
International Search Report for PCT/JP2020/003447 dated Mar. 31, 2020 [PCT/ISA/210/].

WIRING BOARD

CROSS REFERENCE TO RELATED APPLICATIONS

This application is a Rule 53(b) Continuation of International Application No. PCT/JP2020/003447 filed Jan. 30, 2020, claiming priority based on Japanese Patent Application No. 2019-017362 filed Feb. 1, 2019, the respective disclosures of which are incorporated herein by reference in their entirety.

TECHNICAL FIELD

The disclosure relates to wiring boards.

BACKGROUND ART

Metal waveguides have been conventionally used as transmission lines for transmitting high-frequency, microwave or millimeter-wave signals. Current requirements for small high-frequency modules and other factors induce consideration for use of dielectric lines as waveguides.

Patent Literature 1 discloses a dielectric line coupling device including a first conductor plate, a second conductor plate, at least one dielectric stripline, and a dielectric slab, wherein the first conductor plate and the second conductor plate are placed apart from and opposed to each other, the dielectric stripline is placed between the first conductor plate and the second conductor plate, and the dielectric slab includes a thin dielectric plate, is in surface contact with a side of the first or second conductor plate, and has an end in contact with a side of the dielectric stripline.

Patent Literature 2 discloses (1) a method for producing a polytetrafluoroethylene resin porous article including firing an unfired polytetrafluoroethylene resin at a temperature equal to or higher than the melting point of polytetrafluoroethylene resin, pulverizing the fired polytetrafluoroethylene resin to form a fired polytetrafluoroethylene resin powder, molding the powder into a predetermined shape at a pressure of 1 g/cm$^2$ to 800 kg/cm$^2$, and firing the workpiece again at a temperature equal to or higher than the melting point of polytetrafluoroethylene.

CITATION LIST

Patent Literature

Patent Literature 1: JP H11-186818 A
Patent Literature 2: JP S61-66730 A

SUMMARY

The disclosure relates to a wiring board including: a dielectric line containing a resin (A); and a dielectric exterior covering the dielectric line and containing a resin (B), the dielectric exterior having a relative permittivity lower than a relative permittivity of the dielectric line at 6 GHz and 25° C.

Advantageous Effects

The wiring board of the disclosure includes a dielectric line having high efficiency in transmission of high-frequency waves.

BRIEF DESCRIPTION OF THE DRAWINGS

FIG. 1A is a perspective view; and FIG. 1B is a cross-sectional view.

FIG. 2A is a perspective view; and FIG. 2B is a cross-sectional view.

FIG. 3A is a perspective view; and FIG. 3B is a cross-sectional view.

FIG. 4A is a perspective view; and FIG. 4B is a cross-sectional view.

FIG. 5A is a perspective view; and FIG. 5B is a cross-sectional view.

DESCRIPTION OF EMBODIMENTS

Hereinafter, the wiring board of the disclosure is specifically described.

The wiring board of the disclosure includes a dielectric line containing a resin (A), and a dielectric exterior covering the dielectric line and containing a resin (B), the dielectric exterior having a relative permittivity lower than a relative permittivity of the dielectric line at 6 GHz and 25° C.

The dielectric line which is covered with the dielectric exterior having a relative permittivity lower than the relative permittivity of the dielectric line can efficiently transmit high-frequency waves such as millimeter waves and sub-millimeter waves. The dielectric exterior preferably covers 95% or more, more preferably 99% or more of the surface area of the dielectric line. Preferably, the dielectric exterior covers substantially the entire surface.

The relative permittivities of the dielectric line and the dielectric exterior are relative permittivities at 6 GHz and 25° C.

The relative permittivities of the dielectric line and the dielectric exterior, each processed into a cylinder having a diameter of 2 mm, can be measured using a cavity resonator.

To achieve better efficiency in transmission of electromagnetic waves, the wiring board of the disclosure preferably has a ratio of the relative permittivity of the dielectric exterior to the relative permittivity of the dielectric line (relative permittivity of dielectric exterior/relative permittivity of dielectric line) of 0.60 to 0.90 at 6 GHz and 25° C. The ratio is more preferably 0.80 to 0.90 for the wiring board including many straight lines, while more preferably 0.60 to 0.70 for the wiring board including many curves having a radius of curvature of 30 mm. Setting the relative permittivity ratio within the above range enables passage of electromagnetic waves with a small loss even in the case of a curved dielectric line.

The speed of electromagnetic waves in the dielectric is expressed by (light speed C)/{(relative permittivity)$^{1/2}$}. In the case where the dielectric line (inner layer) is in the form of a straight line and the relative permittivities of the inner layer and the dielectric exterior (outer layer) has a relationship of (relative permittivity of inner layer)>(relative permittivity of outer layer), the speed of electromagnetic waves transmitted in the outer layer is higher than the speed of electromagnetic waves transmitted in the inner layer and the electromagnetic waves are totally reflected by the inner wall of the inner layer and thereby transmitted.

Figure 6A:
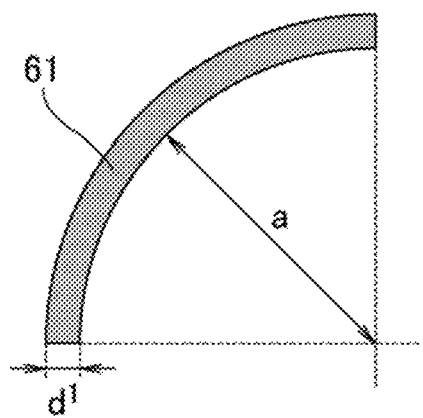
FIGS. 6A and 6B include schematic views FIG. 6A and FIG. 6B of an example of a bent dielectric line in the wiring board of the disclosure.
Figure 6B:
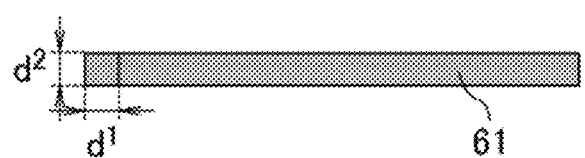

As shown in FIGS. 6A and 6B, in the case of a curved line 61 having a cross-sectional area of $d^1$ (mm)×$d^2$ (mm), the curve in the wiring board can be represented by the radius of curvature a (mm). Table 1 shows the relationship between the relative permittivity ratio and the transmission loss due to the curve in the wiring board.

TABLE 1

| Relative permittivity of outer layer/ relative permittivity of inner layer | Transmission loss (dB/cm) | | |
|---|---|---|---|
| | Radius of curvature 30 mm | Radius of curvature 60 mm | Straight line |
| 0.60 | −0.1 | −1.2 | −3.0 |
| 0.70 | −1.4 | −0.1 | −1.3 |
| 0.90 | −3.0 | −1.3 | −0.2 |

With a relative permittivity ratio of 0.60 to 0.90, a dielectric line produced can work with a transmission loss of −3.0 dB or less against a curve having a radius of curvature of about 30 mm including a straight line.

The relative permittivity of the dielectric line is preferably 2.05 or higher, more preferably 2.10 or higher, still more preferably 2.16 or higher, at 6 GHz and 25° C. The upper limit may be, but is not limited to, 2.20.

The dielectric line preferably has a loss tangent of 1.20× $10^{-4}$ or lower, more preferably 1.00×$10^{-4}$ or lower, still more preferably 0.95×$10^{-4}$ or lower, at 6 GHz and 25° C. The lower limit may be, but is not limited to, 0.10×$10^{-4}$ or 0.80×$10^{-4}$.

The dielectric line contains a resin (A). The resin (A) may be any resin appropriately selected in relation to the dielectric exterior so that the relative permittivity of the dielectric exterior is lower than the relative permittivity of the dielectric line. From the viewpoint of transmission efficiency, the relative permittivity is preferably 3.0 or lower and the loss tangent is preferably 0.003 or lower at 6 GHz and 25° C. Preferably, the relative permittivity is 1.9 or higher and the loss tangent is 0.0002 or lower. More preferably, the relative permittivity is 2.0 or higher and the loss tangent is 0.00015 or lower. The relative permittivity of the resin (A) may be 2.8 or lower or may be 2.5 or lower.

From the viewpoint of low loss, the resin (A) preferably includes at least one selected from the group consisting of polytetrafluoroethylene, a tetrafluoroethylene/hexafluoropropylene copolymer, a tetrafluoroethylene/perfluoro(alkyl vinyl ether) copolymer, polypropylene, and polyethylene, more preferably at least one selected from the group consisting of polytetrafluoroethylene, polypropylene, and polyethylene, and is still more preferably polytetrafluoroethylene (PTFE).

The PTFE in the dielectric line preferably has a specific gravity of 2.160 or higher, more preferably 2.165 or higher, still more preferably 2.170 or higher. The upper limit may be, but is not limited to, 2.30.

The PTFE may be a homopolymer of TFE or a modified PTFE modified with a different monomer.

The modified PTFE is a PTFE containing tetrafluoroethylene (TFE) and a monomer other than TFE (hereinafter, also referred to as a "modifier"). The modified PTFE may be a uniformly modified PTFE or may be a modified PTFE having a core-shell structure described later.

The modified PTFE includes a TFE unit based on TFE and a modifier unit based on a modifier. The modified PTFE is preferably such that the modifier unit represents 0.005 to 1% by mass, more preferably 0.02 to 0.5% by mass, of all monomer units.

The "modifier unit" as used herein means a repeating unit that is a portion of the molecular structure of the modified PTFE and is derived from a comonomer used as a modifier. The modifier unit is represented by —[$CF_2$—CF(—$OC_3F_7$)]— in the case of using perfluoropropyl vinyl ether as a modifier, and by —[$CF_2$—CF(—$CF_3$)]— in the case of using hexafluoropropylene as a modifier.

The modifier may be any one copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkylethylenes, and ethylene. One modifier may be used or multiple modifiers may be used.

An example of the perfluorovinyl ethers is, but not limited to, a perfluorinated unsaturated compound represented by the following formula:

(wherein Rf represents a perfluoroorganic group). The "perfluoroorganic group" as used herein means an organic group obtainable by replacing all hydrogen atoms bonded to any carbon atom by fluorine atoms. The perfluoroorganic group may have ether oxygen.

An example of the perfluorovinyl ethers is a perfluoro (alkyl vinyl ether) (PAVE) in which Rf in the above formula is a C1-C10 perfluoroalkyl group. The carbon number of the perfluoroalkyl group is preferably 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group. The perfluoroalkyl group is preferably a perfluoropropyl group. In other words, the PAVE is preferably perfluoropropyl vinyl ether (PPVE).

Examples of the perfluorovinyl ethers also include those represented by the above formula wherein Rf is a C4-C9 perfluoro(alkoxyalkyl) group, those represented by the above formula wherein Rf is represented by the following formula:

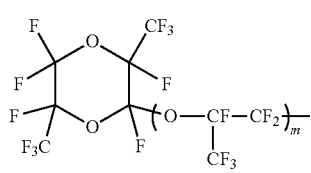
[Chem. 1]

(wherein m represents 0 or an integer of 1 to 4), and those represented by the above formula wherein Rf is represented by the following formula:

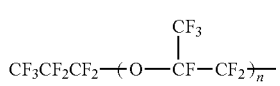
[Chem. 2]

(wherein n represents an integer of 1 to 4).

Examples of the perfluoroalkylethylenes (PFAEs) include, but are not limited to, (perfluorobutyl)ethylene (PFBE) and (perfluorohexyl)ethylene.

The modifier in the modified PTFE preferably includes at least one selected from the group consisting of HFP, CTFE, VDF, PAVE, PFAE, and ethylene. More preferred is PAVE, and still more preferred is PPVE.

The modified PTFE may have a core-shell structure including a particle core and a particle shell.

The PTFE preferably has fibrillatability. The presence or absence of fibrillatability can be determined by "paste extrusion" which is a typical method for molding "high molecular weight PTFE powder" which is a powder formed from a polymer of TFE. Generally, it is the presence of fibrillatability that enables paste extrusion of high molecular weight PTFE. In the case where an unfired molded product obtained by paste extrusion has substantially no strength or elongation, for example the case where an unfired molded product has an elongation of 0% and thus breaks when stretched, the PTFE can be regarded as having no fibrillatability.

The PTFE preferably has non melt-processability. The non melt-processability means a feature that prevents measurement of the melt flow rate of a polymer at a temperature higher than the crystallization melting point in accordance with ASTM D-1238 and D-2116.

The PTFE preferably has a standard specific gravity (SSG) of 2.13 to 2.23, more preferably 2.15 to 2.19. The standard specific gravity is a value measured by the water displacement method in accordance with ASTM D-4895 98.

The PTFE preferably has a first melting point of 333° C. to 347° C., more preferably 335° C. to 345° C. The first melting point is a temperature corresponding to a maximum value in a heat-of-fusion curve obtained by heating at a rate of 10° C./min using a differential scanning calorimeter (DSC) on a PTFE which has no history of being heated to a temperature of 300° C. or higher.

The PTFE used may include a high molecular weight PTFE and a low molecular weight PTFE. The high molecular weight PTFE preferably has a first melting point of 333° C. to 347° C., more preferably 335° C. to 345° C. The low molecular weight PTFE preferably has a first melting point of 322° C. to 333° C., more preferably 324° C. to 332° C. The first melting point is a temperature corresponding to a maximum value in a heat-of-fusion curve obtained by heating at a rate of 10° C./min using a differential scanning calorimeter (DSC) on a PTFE which has no history of being heated to a temperature of 300° C. or higher.

The mass ratio of the high molecular weight PTFE and the low molecular weight PTFE is preferably 80/20 to 99/1, more preferably 85/15 to 97/3, still more preferably 90/10 to 95/5.

The dielectric line preferably has a resin (A) content of 60% by mass or more, preferably 70% by mass or more, particularly preferably 80% by mass or more. The resin (A) content may be substantially 100% by mass.

Preferably, the dielectric line contains an inorganic powder (C) in addition to the resin (A) and has a relative permittivity of 2.2 or higher at 6 GHz and 25° C. Combination use of the resin (A) and the inorganic powder (C) allows adjusting the relative permittivity of the dielectric line. The relative permittivity is preferably 3.0 or higher, more preferably 4.0 or higher, still more preferably 4.5 or higher, particularly preferably 5.0 or higher.

The inorganic powder (C) is preferably a ceramic powder, and more preferably includes, for example, at least one selected from the group consisting of barium titanate-based, strontium titanate-based, calcium titanate-based, magnesium titanate-based, zirconium titanate-based, lanthanum titanate-based, bismuth titanate-based, $Ba(Mg_{1/3}Ta_{2/3})O_3$-based, $Ba(Zn_{1/3}Ta_{2/3})O_3$-based, $CaTiO_3$—$(Li_{1/2}Nd_{1/2})TiO_3$—$(Li_{1/2}Bi_{1/2})TiO_3$-based, magnesium tantalate-based, magnesium niobate-based, alumina-based, magnesia-based, titania-based, tantalum oxide-based, niobium oxide-based, ferrite-based, zirconia-based, and rare-earth complex oxide-based powders. More preferred is at least one selected from the group consisting of barium titanate-based and alumina-based powders.

In the case where the dielectric line contains an inorganic powder (C), the inorganic powder (C) content relative to the dielectric line is preferably 40% by mass or less, more preferably 30% by mass or less, still more preferably 20% by mass or less, particularly preferably 10% by mass or less.

The dielectric line may contain a different component to the extent that the objects of the disclosure are not impaired. Examples of the different component include a surfactant, an antioxidant, a photostabilizer, a fluorescent brightener, a colorant, a pigment, a dye, and a filler. Examples also include carbon black, graphite, alumina, mica, silicon carbide, boron nitride, titanium oxide, bismuth oxide, bronze, gold, silver, copper, and nickel in the form of powder or fibrous powder.

The dielectric line preferably has a specific gravity of 2.160 or higher, more preferably 2.165 or higher, still more preferably 2.170 or higher. The upper limit may be, but is not limited to, 2.30. The dielectric line having a specific gravity within the above range can easily achieve a high relative permittivity as well as a low loss tangent.

The specific gravity is measured by the hydrostatic weighing method (in accordance with JIS Z 8807).

In the dielectric line, the resin (A) preferably has a degree of crystallization of 70% or higher. The degree of crystallization is more preferably 73% or higher, still more preferably 75% or higher. The upper limit may be, but is not limited to, 99%. A degree of crystallization within the above range allows the dielectric line to have a high relative permittivity as well as a low loss tangent.

The degree of crystallization is measured by a specific gravity method.

The dielectric line may have a circular cross-sectional shape such as a perfect circle or an ellipse, or may have a quadrangular cross-sectional shape such as a square or a rectangle. The cross-sectional area of the dielectric line is appropriately selected in accordance with the frequency of electromagnetic waves used. For example, in the case of transmitting 28-GHz high-frequency waves, the cross-sectional area is preferably 2 to 10 $mm^2$, more preferably 5 to 9 $mm^2$.

For example, to transmit 28-GHz high-frequency waves with a square shape, the length of each side is preferably 6.9 to 7.5 mm. This preferred value is inversely proportional to the frequency. For example, in the case of 84 GHz, the length is preferably 2.3 to 2.5 mm.

The length of the dielectric line (the length along the direction in which electromagnetic waves travel) is not limited and is appropriately set in accordance with the size and intended use of the wiring board.

To achieve conversion into a coaxial structure, each end of the dielectric line may be converted into a ¼λ metal rod antenna, a loop antenna, or a one-end waveguide.

The dielectric exterior preferably has a relative permittivity of 1.60 or lower, more preferably 1.43 or lower, still more preferably 1.35 or lower, particularly preferably 1.30 or lower, at 6 GHz and 25° C.

The dielectric exterior preferably has a loss tangent of $1.50 \times 10^{-4}$ or lower, more preferably $1.00 \times 10^{-4}$ or lower, still more preferably $0.60 \times 10^{-4}$ or lower, further more preferably $0.30 \times 10^{-4}$ or lower, at 6 GHz and 25° C.

The dielectric exterior contains a resin (B). The resin (B) may be any resin appropriately selected in relation to the dielectric line so that the relative permittivity of the dielectric exterior is lower than the relative permittivity of the dielectric line. From the viewpoint of transmission efficiency, the relative permittivity is preferably 1.9 or lower and the loss tangent is preferably 0.0012 or lower at 6 GHz and 25° C. More preferably, the relative permittivity is 1.6 or lower and the loss tangent is 0.00020 or lower.

The relative permittivity and loss tangent of the resin (B), which is a material of the dielectric exterior, can be measured using a cavity resonator on the resin (B) processed into a cylinder having a diameter of 2 mm.

From the viewpoints of a low relative permittivity and a low loss tangent (tan δ), the resin (B) preferably includes at least one selected from the group consisting of polytetrafluoroethylene, a tetrafluoroethylene/hexafluoropropylene copolymer, a tetrafluoroethylene/perfluoro(alkyl vinyl ether) copolymer, polypropylene, polyethylene, polystyrene, and polystyrol, more preferably at least one selected from the group consisting of polytetrafluoroethylene, polypropylene, and polyethylene, and is still more preferably polytetrafluoroethylene. The PTFE in the dielectric exterior preferably has a specific gravity of 1.5 or lower, more preferably 1.3 or lower, still more preferably 1.0 or lower. The lower limit may be, but is not limited to, 0.1.

More specific examples of the material of the dielectric exterior include a compression-molded article of sintered and pulverized PTFE powder, an expanded PTFE porous article, and foamed polyethylene.

The compression-molded article of sintered and pulverized PTFE powder will be described later.

The expanded PTFE porous article may be an expanded PTFE porous film obtained by stretching a sheet-shaped PTFE molded article. The expanded PTFE porous article can be produced by a conventionally known method. The relative permittivity and loss tangent of the expanded PTFE porous article can be appropriately controlled in accordance with stretching conditions such as a stretching ratio, a stretching speed, and a stretching temperature. For example, the higher the stretching ratio is, the lower the relative permittivity and the loss tangent are.

The dielectric exterior preferably has a resin (B) content of 60% by mass or more, preferably 70% by mass or more, particularly preferably 80% by mass or more. The resin (B) content may be substantially 100% by mass.

Preferably, the dielectric exterior contains an inorganic powder (D) in addition to the resin (B) and has a relative permittivity of 2.2 or higher at 6 GHz and 25° C. Combination use of the resin (B) and the inorganic powder (D) allows adjusting the relative permittivity of the dielectric exterior. The relative permittivity is preferably 3.0 or higher, more preferably 4.0 or higher, still more preferably 4.5 or higher, particularly preferably 5.0 or higher.

The inorganic powder (D) is preferably a ceramic powder, and more preferably includes, for example, at least one powder selected from the group consisting of barium titanate-based, strontium titanate-based, calcium titanate-based, magnesium titanate-based, zirconium titanate-based, lanthanum titanate-based, bismuth titanate-based, $Ba(Mg_{1/3}Ta_{2/3})O_3$-based, $Ba(Zn_{1/3}Ta_{2/3})O_3$-based, $CaTiO_3$—$(Li_{1/2}Nd_{1/2})TiO_3$—$(Li_{1/2}Bi_{1/2})TiO_3$-based, magnesium tantalate-based, magnesium niobate-based, alumina-based, magnesia-based, titania-based, tantalum oxide-based, niobium oxide-based, ferrite-based, zirconia-based, and rare-earth complex oxide-based powders. More preferred is at least one selected from the group consisting of barium titanate-based and alumina-based powders.

In the case where the dielectric exterior contains an inorganic powder (D), the inorganic powder (D) content relative to the dielectric exterior is preferably 40% by mass or less, more preferably 30% by mass or less, still more preferably 20% by mass or less, particularly preferably 10% by mass or less.

The dielectric exterior preferably has a specific gravity of 1.5 or lower, more preferably 1.3 or lower, still more preferably 1.0 or lower. The lower limit may be, but is not limited to, 0.1. The dielectric exterior having a specific gravity within the above range can easily achieve a low relative permittivity as well as a low loss tangent.

The specific gravity is measured by the hydrostatic weighing method (in accordance with JIS Z 8807).

In the dielectric exterior, the resin (B) preferably has a degree of crystallization of 70% or higher. The degree of crystallization is more preferably 73% or higher, still more preferably 75% or higher. The upper limit may be, but is not limited to, 99%. A degree of crystallization within the above range allows the dielectric exterior to have a high relative permittivity as well as a low loss tangent.

The degree of crystallization is measured by a specific gravity method.

The dielectric exterior may have a cavity covering the dielectric line, and usually has a plate shape.

The dielectric exterior having a plate shape preferably has a thickness that is 0.5 to 1.5 times the long side of a quadrangular cross section or the major diameter of a circular cross section of the dielectric line.

The dielectric exterior having a plate shape preferably has a long side whose length is three or more times the thickness. The length of the long side is preferably four or more times, more preferably five or more times the thickness.

The dielectric exterior preferably has a hardness of 40 or higher, more preferably 45 or higher, still more preferably 50 or higher. The upper limit may be, but is not limited to, 55. The dielectric exterior having a hardness within the above range can stand on its own even with a low density and a low permittivity, and thus can hold an electronic component.

The hardness is measured using a type D durometer specified in JIS K 6253-2012.

The structure of the wiring board of the disclosure will be described in more detail below.

Figure 1A:
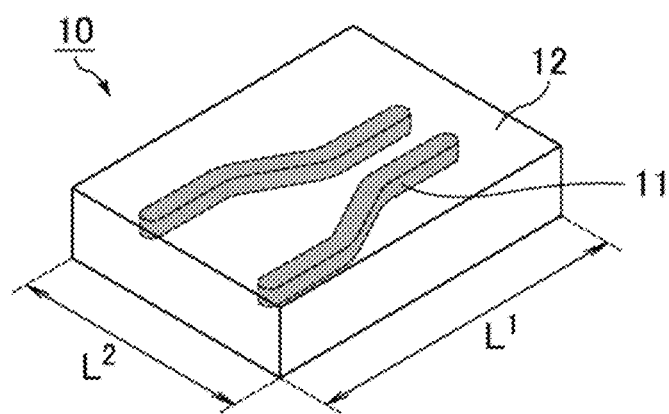
FIGS. 1A and 1B include schematic views of an example of the wiring board of the disclosure; where
Figure 1B:
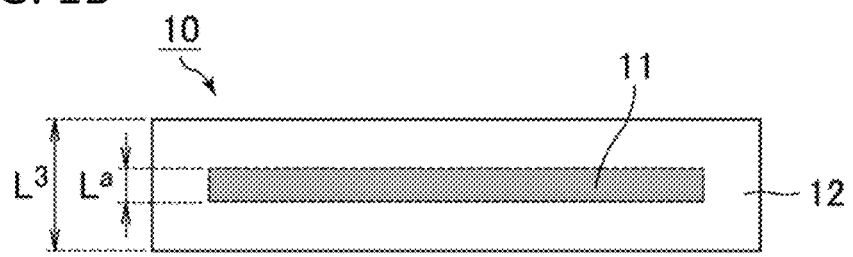

The wiring board of the disclosure has a structure in which the dielectric line is covered with the dielectric exterior. An example is a structure in which, as shown in FIGS. 1A and 1B, a wiring board 10 includes dielectric lines 11 in a dielectric exterior 12.

This structure can be formed, for example, by forming cavities each having a size equal to or larger than the outer dimensions of the respective dielectric lines from a side of the dielectric exterior and then inserting the inner layers.

Alternatively, a laser or an electron beam may be applied to heat the exterior at portions to be inner layers up to a temperature equal to or higher than the melting point of the material of the exterior and thus to increase the permittivity of the portions, whereby dielectric lines may be formed.

In a preferred embodiment of the wiring board of the disclosure, the dielectric exterior has a multilayer structure including a lower layer provided with a groove that accommodates the dielectric line and an upper layer provided above the lower layer.

Figure 2A:
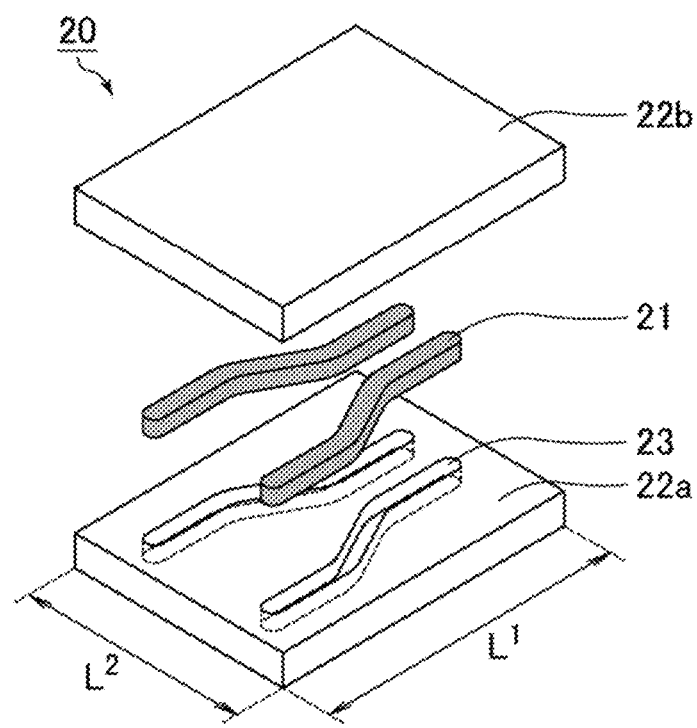
FIGS. 2A and 2B include schematic views of an example of the wiring board of the disclosure; where
Figure 2B:
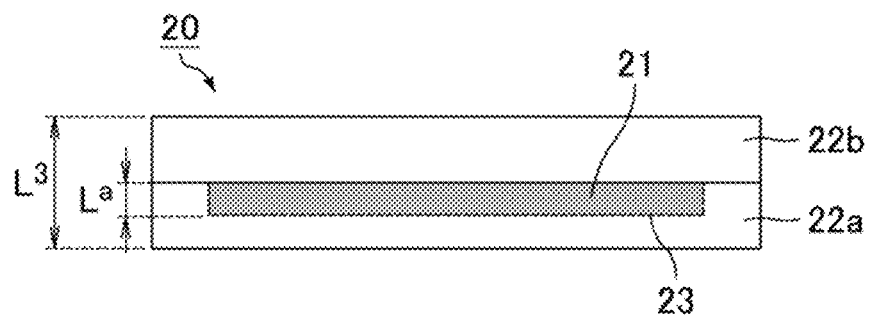

For example, in an embodiment as shown in FIGS. 2A and 2B, a wiring board 20 accommodates dielectric lines 21 in a lower layer 22a provided with grooves 23 that accommodate the dielectric lines 21, and an upper layer 22b is stacked thereon.

Alternatively, a metal die having the same shapes as those of the dielectric lines may be pressed to the lower layer to fire portions of the lower layer and thus to increase the permittivity of the portions, whereby dielectric lines may be formed.

The wiring board also preferably includes an adhesive layer between the lower layer and upper layer of the dielectric exterior. For example, in an embodiment as shown in FIGS. 3A and 3B, a wiring board 30 has an adhesive layer 34 between a lower layer 32a, which includes grooves 33 that accommodate dielectric lines 31, and an upper layer 32b.

Figure 3A:
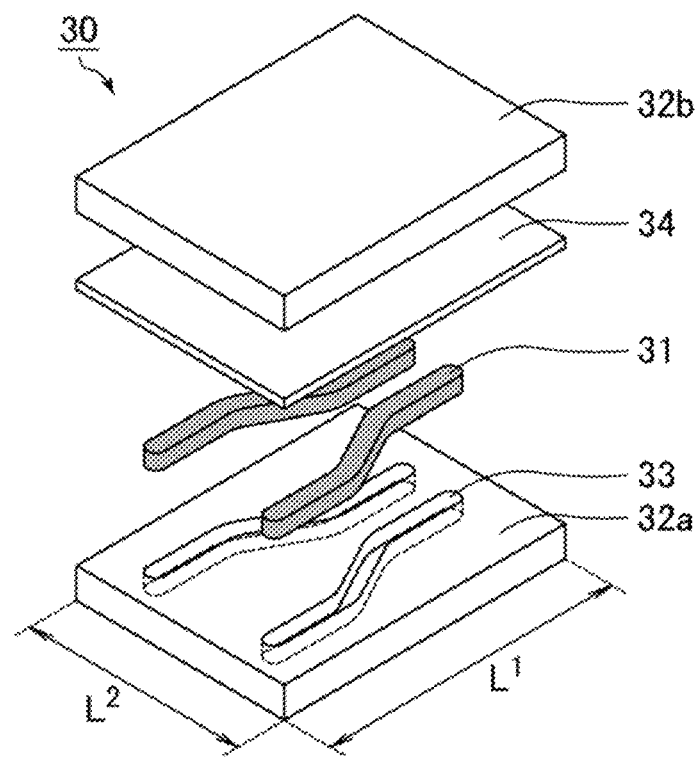
FIGS. 3A and 3B include schematic views of an example of the wiring board of the disclosure; where
Figure 3B:
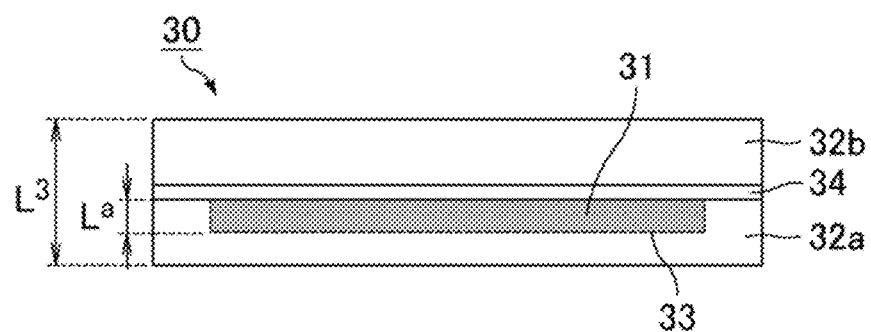

In the case where the dielectric exterior includes an adhesive layer between the lower layer and the upper layer as described above, the thickness of the dielectric exterior as used herein is the sum of the thicknesses of the lower layer, the upper layer, and the adhesive layer, as expressed by $L^3$ in FIGS. 3A and 3B.

The material of the adhesive layer may have any relative permittivity appropriately determined in accordance with the relative permittivities of the dielectric line and the dielectric exterior. The relative permittivity of the material is preferably lower than that of the dielectric line.

The material of the adhesive layer preferably has a loss tangent of 0.003 or lower, more preferably 0.002 or lower, still more preferably 0.0015 or lower, at 6 GHz and 25° C.

The loss tangent can be measured using a cavity resonator.

The material of the adhesive layer preferably includes at least one selected from the group consisting of polytetrafluoroethylene, a tetrafluoroethylene/hexafluoropropylene copolymer, a tetrafluoroethylene/perfluoro(alkyl vinyl ether) copolymer, polyethylene, and polypropylene, more preferably at least one selected from the group consisting of a tetrafluoroethylene/perfluoro(alkyl vinyl ether) copolymer (PFA), polypropylene, and polyethylene.

For example, the PAVE constituting the PFA may include at least one selected from the group consisting of one represented by the following formula (1):

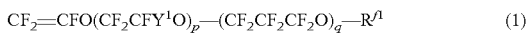

(wherein $Y^1$ represents F or $CF_3$; $R^{f1}$ represents a C1-C5 perfluoroalkyl group; p represents an integer of 0 to 5; and q represents an integer of 0 to 5) and one represented by the following formula (2):

(wherein Xs are the same as or different from each other and each represent H, F or $CF_3$; and $R^1$ represents a C1-C6 linear or branched fluoroalkyl group optionally containing one or two atoms of at least one element selected from the group consisting of H, Cl, Br, and I or a C5-C6 cyclic fluoroalkyl group optionally containing one or two atoms of at least one element selected from the group consisting of H, Cl, Br, and I).

In particular, the PAVE preferably has a bulky side chain. Specifically preferred is perfluoro(propyl vinyl ether) (PPVE).

The PFA preferably contains a PAVE unit in an amount of more than 1.0% by mass of all polymerized units and preferably contains a PAVE unit in an amount of 10% by mass or less of all polymerized units.

The amount of the PAVE unit is more preferably 2.0% by mass or more, still more preferably 3.5% by mass or more, particularly preferably 4.0% by mass or more, most preferably 5.0% by mass or more, while more preferably 8.0% by mass or less, still more preferably 7.0% by mass or less, particularly preferably 6.5% by mass or less, most preferably 6.0% by mass or less, of all polymerized units.

The amount of the PAVE unit is measured by $^{19}$F-NMR.

The PFA preferably has a melting point of 280° C. to 322° C.

The melting point is more preferably 290° C. or higher and 315° C. or lower.

The melting point is a temperature corresponding to a maximum value in a heat-of-fusion curve obtained by heating at a rate of 10° C./min using a differential scanning calorimeter (DSC).

The PFA preferably has a glass transition temperature (Tg) of 70° C. to 110° C. The glass transition temperature is more preferably 80° C. or higher and 100° C. or lower.

The glass transition temperature is a value obtained by dynamic viscoelasticity measurement.

For example, a sheet formed from the above material may be inserted between the lower layer and the upper layer and then the workpiece may be heated and pressed, whereby a wiring board including an adhesive layer can be formed. The heating and pressing conditions may be appropriately selected in accordance with the material. For example, the heating temperature is preferably equal to or higher than the melting point of the material.

The adhesive layer preferably has a thickness of 10 to 100 μm. Too thin an adhesive layer may have poor adhesiveness, while too thick an adhesive layer may have a high transmission loss. The thickness is more preferably 20 to 60 μm.

Figure 4A:
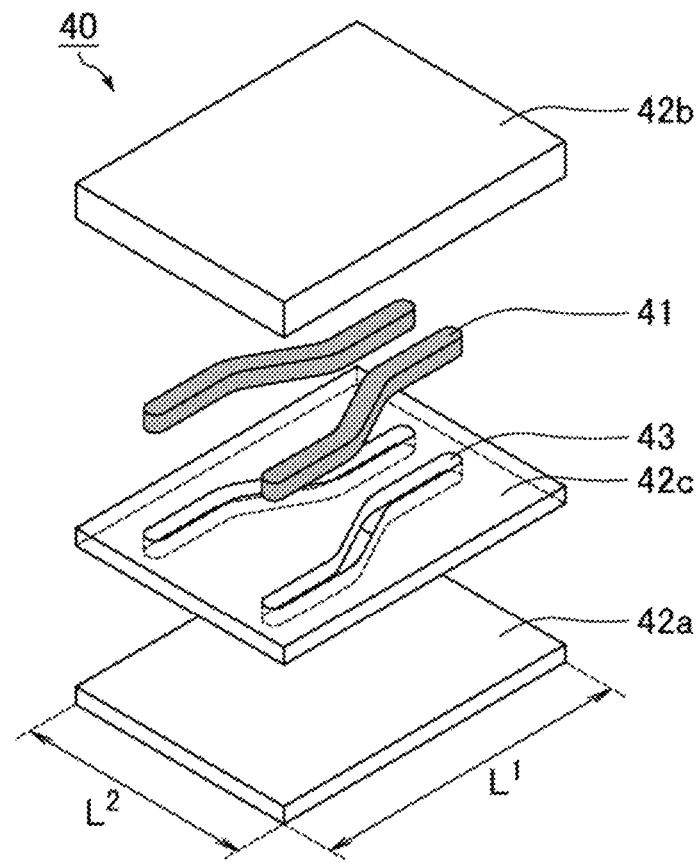
FIGS. 4A and 4B include schematic views of an example of the wiring board of the disclosure; where
Figure 4B:
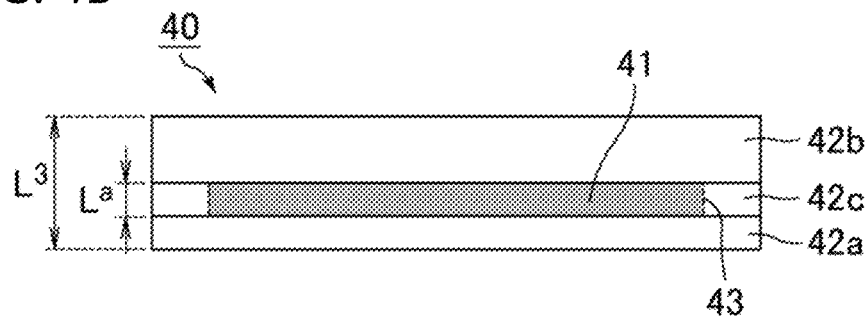

The dielectric exterior in the wiring board of the disclosure also preferably has a multilayer structure including a lower layer, an intermediate layer provided above the lower layer and provided with a cavity that accommodates the dielectric line, and an upper layer provided above the intermediate layer. For example, in an embodiment as shown in FIGS. 4A and 4B, a wiring board 40 accommodates dielectric lines 41 in an intermediate layer 42c provided with cavities 43 that accommodate the dielectric lines 41, and an upper layer 42b is stacked thereon.

The dielectric exterior preferably includes an adhesive layer between the lower layer and the intermediate layer or between the intermediate layer and the upper layer, and more preferably has an adhesive layer both between the lower layer and the intermediate layer and between the intermediate layer and the upper layer. For example, in an embodiment as shown in FIGS. 5A and 5B, a wiring board 50 accommodates dielectric lines 51 in an intermediate layer 52c provided with cavities 53 that accommodate the dielectric lines 51, includes an adhesive layer 52b between an upper layer 52b and an intermediate layer 54c, and also includes an adhesive layer 54a between the intermediate layer 52c and the lower layer 52a.

The adhesive layer used may be the same as that described above.

Figure 5A:
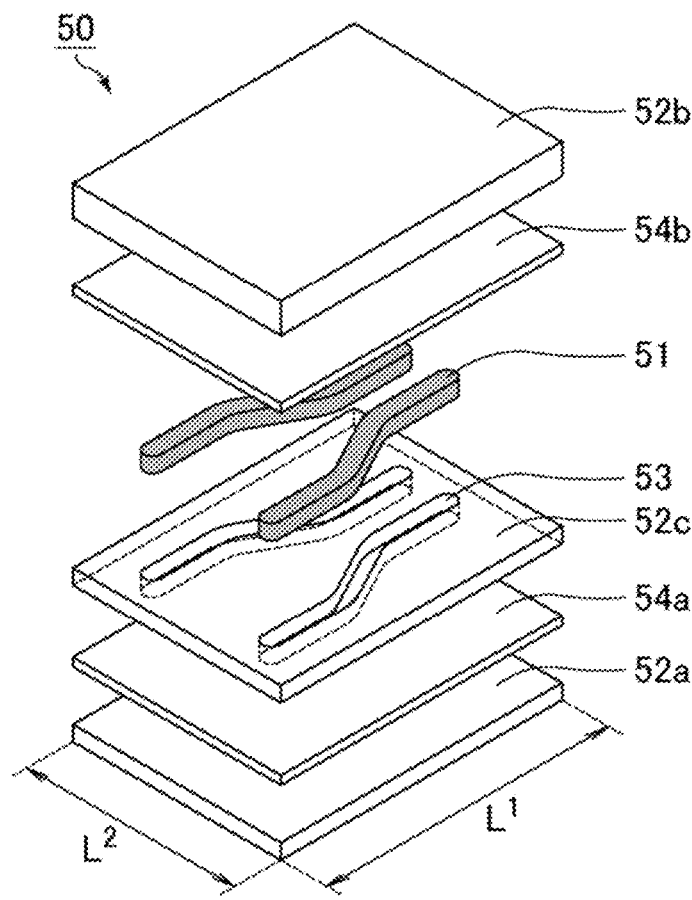
FIGS. 5A and 5B include schematic views of an example of the wiring board of the disclosure; where
Figure 5B:
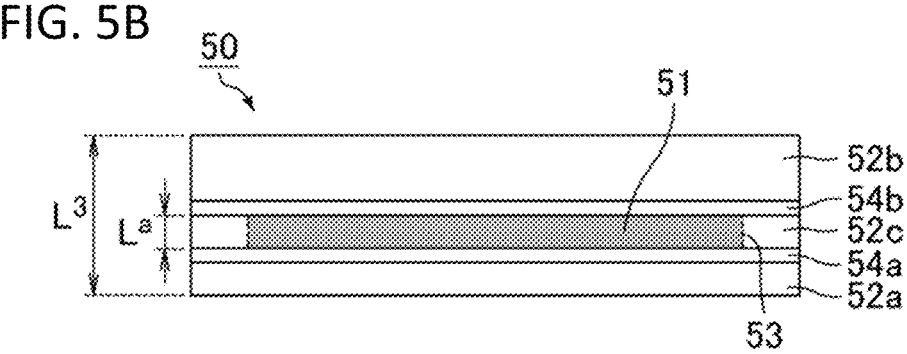

In the case where an adhesive layer is provided between the lower layer and the intermediate layer and between the intermediate layer and the upper layer as described above, the thickness of the dielectric exterior as used herein is the sum of the thicknesses of the lower layer, the intermediate layer, the upper layer, and the adhesive layers as expressed by $L^3$ in FIGS. 5A and 5B.

A more preferred embodiment of the wiring board of the disclosure will be described in detail below.

In a preferred embodiment, the wiring board of the disclosure includes a dielectric line containing polytetrafluoroethylene and a dielectric exterior containing polytetrafluoroethylene and covering the dielectric line, the dielectric exterior having a relative permittivity lower than a relative permittivity of the dielectric line at 6 GHz and 25° C.

The polytetrafluoroethylene contained in the dielectric line and the polytetrafluoroethylene contained in the dielectric exterior may be the same as or different from each other.

The properties such as relative permittivity and hardness of the dielectric line and the dielectric exterior can be adjusted in accordance with factors such as molding conditions and materials other than polytetrafluoroethylene.

For example, the relative permittivity of the dielectric line may be made higher than that of the dielectric exterior by blending an inorganic powder having high permittivity into the PTFE constituting the dielectric line. Alternatively, the dielectric line may be produced by paste-extrusion-molding and firing PTFE while the dielectric exterior may be produced by compacting and molding a sintered and pulverized PTFE powder, whereby the dielectric exterior may be caused to have a low density, and as a result the relative permittivity of the dielectric exterior may be made lower than that of the dielectric line, In addition, the wiring board can stand on its own even with a low permittivity, and thus can hold an electronic component.

The PTFE contained in the dielectric line may be semi-fired PTFE. The dielectric line containing a semi-fired PTFE can be produced by a method including: paste-extrusion-molding an unfired PTFE powder to provide an unfired PTFE molded article; and firing the unfired PTFE molded article at 320° C. to 340° C. for 10 seconds to 180 minutes to provide a PTFE molded article containing a semi-fired PTFE. The production method may include molding the PTFE molded article containing a semi-fired PTFE into the shape of a dielectric line.

Specific heating conditions are appropriately changed in accordance with the shape and size of the PTFE molded article. For example, the PTFE molded article is preferably obtained by heating an unfired PTFE at 326° C. to 345° C. for 10 seconds to 2 hours. The heating temperature is more preferably 330° C. or higher.

The unfired PTFE is a PTFE having no history of being heated to 326° C. or higher, and is preferably a PTFE having no history of being heated to 300° C. or higher.

Heating the unfired PTFE at the above temperature for a predetermined duration seems to cause release of the air contained therein to the outside, which can presumably provide a PTFE molded article having a high relative permittivity. Also, the unfired PTFE is not completely fired, which can presumably provide a PTFE molded article having a low loss tangent.

The heating may be performed using a salt bath, a sand bath, or a hot air circulation electric furnace, for example.

The semi-fired PTFE molded article is preferably obtained without heating an unfired PTFE to a temperature higher than 345° C. If an unfired PTFE has been heated to a temperature higher than 345° C. even once, the original crystallinity of the unfired PTFE is collapsed, which may cause a failure in providing a PTFE molded article having a high degree of crystallization. In contrast, a PTFE molded article obtained not by heating an unfired PTFE to a temperature higher than 345° C. but by heating an unfired PTFE at 326° C. to 345° C. for 10 seconds to 2 hours has crystallinity equivalent to that of the unfired PTFE and has a high relative permittivity and a low loss tangent.

The unfired PTFE molded article is preferably obtained by paste-extrusion-molding a mixture containing an unfired PTFE powder and an extrusion aid. The paste extrusion molding may be followed by drying of the extrudate obtained, so that the extrusion aid may be removed. The mixture may be prepared by mixing an unfired PTFE powder and an extrusion aid by a known method, aging the mixture for 1 to 24 hours, and premolding the aged mixture at a pressure of 0.5 to 2.0 MPa. The paste extrusion can be performed at an extrusion pressure of 2 to 100 MPa.

The duration of heating the unfired PTFE varies in accordance with the diameter of the unfired PTFE, the heating temperature, and the equipment used for heating.

For example, in the case of heating in a hot air circulation electric furnace, the heating duration is preferably 3 minutes to 2 hours, more preferably 10 minutes to 30 minutes.

The production method preferably includes: paste-extrusion-molding a mixture of an unfired PTFE powder and an extrusion aid to provide an unfired PTFE molded article; drying the unfired PTFE molded article to remove the extrusion aid; heating the dried molded article at 326° C. to 345° C. for 10 seconds to 2 hours; and producing a dielectric line using the PTFE molded article.

To produce a molded article having a high relative permittivity and a low loss tangent, the production method preferably never includes heating an unfired PTFE to a temperature higher than 345° C.

The method for producing a dielectric line using the PTFE molded article varies in accordance with the characteristics of a dielectric line required, and will be described in, for example, experimental examples described later.

The dielectric exterior can be obtained by molding PTFE. For example, the dielectric exterior can be obtained by a method including putting a PTFE powder into a mold and compression-molding the PTFE powder by heating and pressing.

The heating temperature is preferably equal to or higher than the melting point of PTFE, more preferably 340° C. or higher, still more preferably 350° C. or higher, while preferably 380° C. or lower.

The pressure in the pressing is, for example, preferably 10 g/cm$^2$ or higher, more preferably 20 g/cm$^2$ or higher, still more preferably 30 g/cm$^2$ or higher, while preferably 3000 g/cm$^2$ or lower.

The PTFE contained in the dielectric exterior is preferably obtained by compression-molding a sintered and pulverized PTFE powder.

The sintered and pulverized PTFE powder can be obtained by a sintering and pulverizing method. Using a sintered and pulverized powder enables easy production of a dielectric exterior having a low relative permittivity and a low loss tangent and having a hardness that ensures holding of an electronic component.

The sintered and pulverized powder preferably has an average particle size of 50 to 3000 μm. The average particle size is more preferably 100 μm or greater, more preferably 300 μm or greater, while more preferably 2000 μm or smaller, still more preferably 1500 μm or smaller.

The average particle size is defined to be equivalent to the particle size corresponding to 50% of the cumulative volume in the particle size distribution determined using a laser diffraction particle size distribution analyzer (HELOS & RODOS) available from Jeol Ltd. at a dispersive pressure of 3.0 bar without cascade impaction.

The sintered and pulverized powder can be obtained, for example, by heating a PTFE powder at a temperature equal to or higher than the melting point for 0.1 to 10 hours, and then pulverizing the resulting solid.

The heating temperature is more preferably 340° C. or higher, still more preferably 350° C. or higher, while more preferably 380° C. or lower.

The pulverization can be performed using a device such as a mixer or an air jet mill. The pulverization may be performed under any conditions.

In the case where the dielectric exterior includes an upper layer and a lower layer as described above, the dielectric exterior can be produced by separately producing the upper layer and the lower layer by, for example, the aforementioned methods, stacking the upper layer and the lower layer, and then heating and pressing the workpiece. Similarly in the case of providing an adhesive layer, the dielectric exterior can be produced by stacking the upper layer, the adhesive layer, and the lower layer, and then heating and pressing the workpiece. In the case of providing an upper layer, an intermediate layer, and a lower layer or providing an upper layer, an adhesive layer, an intermediate layer, an adhesive layer, and a lower layer, the dielectric exterior can be produced in the same manner.

In the case where the dielectric line and the dielectric exterior contain polytetrafluoroethylene, the adhesive layer is preferably a layer containing PFA so as to achieve excellent features such as transmission efficiency and low loss performance.

The heating and pressing are performed such that the upper layer and the lower layer, the upper layer and the intermediate layer, and the intermediate layer and the lower layer adhere to each other. For example, the heating and pressing are preferably performed at a temperature equal to or higher than the melting point of the material of the adhesive layer and at a pressure of 10 g/cm$^2$ or higher.

(End Processing Method)

An end of the dielectric line may be treated such that a ¼λ metal rod is aligned with the end of the dielectric line in the same manner as in the dielectric line coupling device described in JP H11-186818 A, for example. The dielectric line may be connected to a coaxial cable by, for example, waveguide coaxial conversion.

The wiring board of the disclosure can be used, for example, as a printed wiring board for transmission of high-frequency waves, and the printed board may include metal foil such as copper foil bonded thereto.

The disclosure relates to a wiring board including: a dielectric line containing a resin (A); and a dielectric exterior covering the dielectric line and containing a resin (B), the dielectric exterior having a relative permittivity lower than a relative permittivity of the dielectric line at 6 GHz and 25° C.

The wiring board of the disclosure preferably has a ratio of the relative permittivity of the dielectric exterior to the relative permittivity of the dielectric line (relative permittivity of dielectric exterior/relative permittivity of dielectric line) of 0.60 to 0.90 at 6 GHz and 25° C.

The resin (A) preferably has a relative permittivity of 3.0 or lower and a loss tangent of 0.003 or lower at 6 GHz and 25° C. The resin (A) more preferably includes at least one selected from the group consisting of polytetrafluoroethylene, a tetrafluoroethylene/hexafluoropropylene copolymer, a tetrafluoroethylene/perfluoro(alkyl vinyl ether) copolymer, polypropylene, and polyethylene.

The dielectric line preferably further contains an inorganic powder (C) and has a relative permittivity of 2.2 or higher at 6 GHz and 25° C. The inorganic powder (C) is preferably a ceramic powder, and more preferably includes at least one selected from the group consisting of barium titanate-based, strontium titanate-based, calcium titanate-based, magnesium titanate-based, zirconium titanate-based, lanthanum titanate-based, bismuth titanate-based, Ba(Mg$_{1/3}$Ta$_{2/3}$)O$_3$-based, Ba(Zn$_{1/3}$Ta$_{2/3}$)O$_3$-based, CaTiO$_3$—(Li$_{1/2}$Nd$_{1/2}$)TiO$_3$—(Li$_{1/2}$Bi$_{1/2}$)TiO$_3$-based, magnesium tantalate-based, magnesium niobate-based, alumina-based, magnesia-based, titania-based, tantalum oxide-based, niobium oxide-based, ferrite-based, zirconia-based, and rare-earth complex oxide-based powders.

The resin (B) preferably has a relative permittivity lower than the relative permittivity of the dielectric line and has a loss tangent of 0.0012 or lower at 6 GHz and 25° C., and more preferably includes at least one selected from the group consisting of polytetrafluoroethylene, a tetrafluoroethylene/hexafluoropropylene copolymer, a tetrafluoroethylene/perfluoro(alkyl vinyl ether) copolymer, polypropylene, polyethylene, polystyrene, and polystyrol.

The dielectric exterior preferably further contains an inorganic powder (D), and has a relative permittivity of 2.2 or higher at 6 GHz and 25° C. The inorganic powder (D) is preferably a ceramic powder, and more preferably includes at least one selected from the group consisting of barium titanate-based, strontium titanate-based, calcium titanate-based, magnesium titanate-based, zirconium titanate-based, lanthanum titanate-based, bismuth titanate-based, Ba(Mg$_{1/3}$Ta$_{2/3}$)O$_3$-based, Ba(Zn$_{1/3}$Ta$_{2/3}$)O$_3$-based, CaTiO$_3$—(Li$_{1/2}$Nd$_{1/2}$)TiO$_3$—(Li$_{1/2}$Bi$_{1/2}$)TiO$_3$-based, magnesium tantalate-based, magnesium niobate-based, alumina-based, magnesia-based, titania-based, tantalum oxide-based, niobium oxide-based, ferrite-based, zirconia-based, and rare-earth complex oxide-based powders.

In a preferred embodiment of the wiring board of the disclosure, the dielectric exterior has a multilayer structure including a lower layer provided with a groove that accommodates the dielectric line and an upper layer provided above the lower layer.

The dielectric exterior preferably includes an adhesive layer between the lower layer and the upper layer. A material of the adhesive layer preferably has a loss tangent of 0.003 or lower at 6 GHz and 25° C., and more preferably includes at least one selected from the group consisting of polytetrafluoroethylene, a tetrafluoroethylene/hexafluoropropylene copolymer, a tetrafluoroethylene/perfluoro(alkyl vinyl ether) copolymer, polyethylene, and polypropylene.

In a preferred embodiment of the wiring board of the disclosure, the dielectric exterior has a multilayer structure including a lower layer, an intermediate layer provided above the lower layer and provided with a cavity that accommodates the dielectric line, and an upper layer provided above the intermediate layer. The dielectric exterior preferably includes an adhesive layer between the lower layer and the intermediate layer or between the intermediate layer and the upper layer. A material of the adhesive layer preferably has a loss tangent of 0.003 or lower at 6 GHz and 25° C., and more preferably includes at least one selected from the group consisting of polytetrafluoroethylene, a tetrafluoroethylene/hexafluoropropylene copolymer, a tetrafluoroethylene/perfluoro(alkyl vinyl ether) copolymer, polyethylene, and polypropylene.

Preferably, the dielectric exterior has a plate shape, and a length of a long side is three or more times as long as a thickness.

EXAMPLES

Next, the wiring board of the disclosure will be described with reference to examples, but the wiring board of the disclosure is not limited to these examples.

The parameters in the examples were determined by the following methods.

Relative Permittivity and Loss Tangent (Tan δ)

The relative permittivities and the loss tangents (tan δ) of the dielectric line and the exterior were determined using a cavity resonator (6 GHz) and calculation software available from Kanto Electronic Application and Development Inc.

Hardness

The hardness was measured using a type D durometer specified in JIS K 6253-2012.

Specific Gravity

The specific gravity was measured by the hydrostatic weighing method (in accordance with JIS Z 8807).

Example 1

(Method of Producing Dielectric Line)

One kilogram of a polytetrafluoroethylene fine powder having a standard specific gravity (SSG) of 2.175 was mixed with 410 g of a hydrocarbon solvent, whereby a PTFE paste was prepared. Next, the PTFE paste was molded by paste extrusion molding using an extrusion die having an extrusion shape of 10 mm×10 mm, whereby a PTFE molded article having a cross section of 10 mm×10 mm was obtained. The resulting PTFE molded article was placed in a hot air electric furnace and the temperature was increased stepwise from 100° C. to 250° C., whereby the hydrocarbon solvent was evaporated, scattered, and thus removed.

The dried cylindrical PTFE molded article was put into a hot air electric furnace heated to 337° C. and fired for two hours, whereby a cylindrical PTFE molded article was obtained. The cross section after the firing was 10.5 mm×10.5 mm. This molded article was cut into a 100-mm piece to be used as a dielectric line (inner layer).

The resulting dielectric line had a relative permittivity of 2.18 and a loss tangent of 0.00010 at 6 GHz and 25° C. The specific gravity of the dielectric line was 2.195.

(Method of Producing Dielectric Exterior)

One kilogram of a polytetrafluoroethylene fine powder having a standard specific gravity (SSG) of 2.175 was put into a stainless steel container and heated in a hot air electric furnace at 360° C. for three hours. The resulting solid was put into a food mixer and pulverized, and then passed through an 8-mesh stainless steel mesh. Thereby, a sintered and pulverized PTFE powder having a particle size of 1.7 mm or smaller was produced.

This sintered and pulverized powder in an amount of 108 g was uniformly put into a stainless steel mold having a size of 110 mm×110 mm and placed in a hot air electric furnace at 360° C. for three hours while being pressed (36.5 g/cm$^2$) with a 4416-g upper mold. The molded article was cooled to room temperature, and then taken out.

As a result, an outer layer A serving as a dielectric exterior was obtained which had a thickness of 10 mm, a size of 100 mm×100 mm, a weight of 108 g, a specific gravity of 1.0, and a dielectric loss of 1.50, a loss tangent of 0.0001, and a hardness of 95 at 6 GHz and 25° C.

Similarly, 78 g of the sintered and pulverized powder was heated under pressure. Thereby, an outer layer B was obtained which had a thickness of 7.5 mm, a size of 100 mm×100 mm, a weight of 108 g, a specific gravity of 1.0, and a relative permittivity of 1.50, a loss tangent of 0.0001, and a hardness of 75 at 6 GHz and 25° C.

(Assembly Method)

The outer layer A was provided at the central portion with a hole having a size of 10.5 mm×70 mm in the thickness direction, and the dielectric line (inner layer) produced above was fitted into the hole, whereby an assembly D was obtained. Then, a stack of 7.5-mm-thick outer layer B/25-μm PFA sheet (relative permittivity: 2.12, loss tangent: 0.0012)/ assembly D/25-μm PFA sheet (relative permittivity: 2.12, loss tangent: 0.0012)/7.5-mm-thick outer layer B was pressed and heated in a hot air electric furnace at 350° C. for three hours while being pressed (36.5 g/cm$^2$) with the aforementioned upper mold (4416 g). For the resulting wiring board, the relative permittivity and the loss tangent of a portion excluding the dielectric line was measured using a 6-GHz cavity resonator. Thereby, the relative permittivity and the loss tangent of the dielectric exterior were determined and were 1.52 and 0.00015, respectively.

(End Processing Method)

Each end (10 mm) of the 100-mm-long dielectric line formed above and having a size of 10 mm×10 mm was cut into a quadrangular pyramid shape and inserted into a rectangular waveguide coaxial converter. Then, the transmission loss was measured and was −2 dB at 28 GHz. (Note: when 28-GHz electromagnetic waves are passed through a 100-mm LCP substrate, which is commonly used for high frequency waves, the transmission loss is −5 to −7 dB.)

Reference Example 1

(Increase in Permittivity of Dielectric Line)

A polytetrafluoroethylene fine powder having a standard specific gravity (SSG) of 2.175 was mixed with alumina having a specific gravity of 3.97 so as to give 10 vol %, and further mixed with a hydrocarbon solvent, whereby a PTFE paste was prepared. Next, the PTFE paste was injected into a mold having a cylinder diameter of 25 mm and the PTFE paste was molded by paste extrusion molding using an extrusion die having an extrusion shape having a diameter of 1.8 mm. Thereby, a PTFE molded article having a diameter of 1.8 mm was obtained. The resulting PTFE molded article was placed in a hot air electric furnace and the temperature was increased stepwise from 100° C. to 250° C., whereby the hydrocarbon solvent was evaporated, scattered, and thus removed. The product was placed in a hot air electric furnace set at 360° C. and fired for five minutes. The temperature was decreased to 270° C. at a rate of 5° C. per hour, and then decreased to room temperature at a rate of 20° C. per hour.

The alumina used had a relative permittivity and loss tangent of 10 and 0.0002, respectively, at 1 MHz.

The electrical properties, i.e., relative permittivity and loss tangent (tan δ), of the resulting PTFE molded article were measured using a cavity resonator available from Kanto Electronic Application and Development Inc.

The relative permittivity and loss tangent of the PTFE molded article formed above were 2.36 and 0.0002, respectively, at 6 GHz and 25° C.

Reference Example 2

A PTFE molded article was obtained through the same operations as in Reference Example 1 except that no alumina was added.

The relative permittivity and loss tangent of the PTFE molded article formed above were 2.01 and 0.0002, respectively, at 6 GHz and 25° C.

REFERENCE SIGNS LIST

10, 20, 30, 40, 50: wiring board
11, 21, 31, 41, 51: dielectric line
12: dielectric exterior
22a, 32a, 42a, 52a: lower layer of dielectric exterior
22b, 32b, 42b, 52b: upper layer of dielectric exterior
42c, 52c: intermediate layer 34, 54a, 54b: adhesive layer
23, 33, 43, 53: groove
$L^1$: long side of dielectric exterior
$L^2$: short side of dielectric exterior
$L^3$: thickness of dielectric exterior
$L^a$: thickness of dielectric line

The invention claimed is:

1. A wiring board comprising:
a dielectric line containing a resin (A); and
a dielectric exterior covering the dielectric line and containing a resin (B),
the dielectric exterior having a relative permittivity lower than a relative permittivity of the dielectric line at 6 GHz and 25° C.,
wherein the dielectric exterior covers 95% or more of a surface area of the dielectric line,
wherein a material of the dielectric exterior is a compression-molded article of sintered and pulverized polytetrafluoroethylene powder,
wherein the dielectric exterior has a plate shape, and in the case where the dielectric line has a quadrangular cross section, the dielectric exterior has a thickness that is 0.5 to 1.5 times a long side of the quadrangular cross section of the dielectric line, and in the case where the dielectric line has a circular cross section, the dielectric exterior has a thickness that is 0.5 to 1.5 times a major diameter of the circular cross section of the dielectric line.

2. The wiring board according to claim 1,
wherein the wiring board has a ratio of the relative permittivity of the dielectric exterior to the relative permittivity of the dielectric line, (relative permittivity of dielectric exterior/relative permittivity of dielectric line) of 0.60 to 0.90 at 6 GHz and 25° C.

3. The wiring board according to claim 1,
wherein the resin (A) has a relative permittivity of 3.0 or lower and a loss tangent of 0.003 or lower at 6 GHz and 25° C.

4. The wiring board according to claim 1,
wherein the resin (A) includes at least one selected from the group consisting of polytetrafluoroethylene, a tetrafluoroethylene/hexafluoropropylene copolymer, a tetrafluoroethylene/perfluoro(alkyl vinyl ether) copolymer, polypropylene, and polyethylene.

5. The wiring board according to claim 1,
wherein the dielectric line further contains an inorganic powder (C) and has a relative permittivity of 2.2 or higher at 6 GHz and 25° C.

6. The wiring board according to claim 5,
wherein the inorganic powder (C) is a ceramic powder.

7. The wiring board according to claim 5,
wherein the inorganic powder (C) includes at least one selected from the group consisting of barium titanate-based, strontium titanate-based, calcium titanate-based, magnesium titanate-based, zirconium titanate-based, lanthanum titanate-based, bismuth titanate-based, $Ba(Mg_{1/3}Ta_{2/3})O_3$-based, $Ba(Zn_{1/3}Ta_{2/3})O_3$-based, $CaTiO_3$-$(Li_{1/2}Nd_{1/2})TiO_3$-$(Li_{1/2}Bi_{1/2})TiO_3$-based, magnesium tantalate-based, magnesium niobate-based, alumina-based, magnesia-based, titania-based, tantalum oxide-based, niobium oxide-based, ferrite-based, zirconia-based, and rare-earth complex oxide-based powders.

8. The wiring board according to claim 1,
wherein the resin (B) has a relative permittivity lower than the relative permittivity of the dielectric line and a loss tangent of 0.0012 or lower at 6 GHz and 25° C.

9. The wiring board according to claim 1,
wherein the resin (B) includes at least one selected from the group consisting of polytetrafluoroethylene, a tetrafluoroethylene/hexafluoropropylene copolymer, a tetrafluoroethylene/perfluoro(alkyl vinyl ether) copolymer, polypropylene, polyethylene, polystyrene, and polystyrol.

10. The wiring board according to claim 1,
wherein the dielectric exterior further contains an inorganic powder (D) and has a relative permittivity of 2.2 or higher at 6 GHz and 25° C.

11. The wiring board according to claim 10,
wherein the inorganic powder (D) is a ceramic powder.

12. The wiring board according to claim 10,
wherein the inorganic powder (D) includes at least one selected from the group consisting of barium titanate-based, strontium titanate-based, calcium titanate-based, magnesium titanate-based, zirconium titanate-based, lanthanum titanate-based, bismuth titanate-based, $Ba(Mg_{1/3}Ta_{2/3})O_3$-based, $Ba(Zn_{1/3}Ta_{2/3})O_3$-based, $CaTiO_3$-$(Li_{1/2}Nd_{1/2})TiO_3$-$(Li_{1/2}Bi_{1/2})TiO_3$-based, magnesium tantalate-based, magnesium niobate-based, alumina-based, magnesia-based, titania-based, tantalum oxide-based, niobium oxide-based, ferrite-based, zirconia-based, and rare-earth complex oxide-based powders.

13. The wiring board according to claim 1,
wherein the dielectric exterior has a multilayer structure including a lower layer provided with a groove that accommodates the dielectric line and an upper layer provided above the lower layer.

14. The wiring board according to claim 13,
wherein the dielectric exterior includes an adhesive layer between the lower layer and the upper layer.

15. The wiring board according to claim 14,
wherein a material of the adhesive layer has a loss tangent of 0.003 or lower at 6 GHz and 25° C.

16. The wiring board according to claim 14,
wherein a material of the adhesive layer includes at least one selected from the group consisting of polytetrafluoroethylene, a tetrafluoroethylene/hexafluoropropylene copolymer, a tetrafluoroethylene/perfluoro(alkyl vinyl ether) copolymer, polyethylene, and polypropylene.

17. The wiring board according to claim 1,
wherein the dielectric exterior has a multilayer structure including a lower layer, an intermediate layer provided above the lower layer and provided with a cavity that accommodates the dielectric line, and an upper layer provided above the intermediate layer.

18. The wiring board according to claim 17,
wherein the dielectric exterior includes an adhesive layer between the lower layer and the intermediate layer or between the intermediate layer and the upper layer.

19. The wiring board according to claim 18,
wherein a material of the adhesive layer has a loss tangent of 0.003 or lower at 6 GHz and 25° C.

20. The wiring board according to claim 18,
wherein a material of the adhesive layer includes at least one selected from the group consisting of polytetrafluoroethylene, a tetrafluoroethylene/hexafluoropropylene copolymer, a tetrafluoroethylene/perfluoro(alkyl vinyl ether) copolymer, polyethylene, and polypropylene.

21. The wiring board according to claim 1,
wherein a length of a long side of the dielectric exterior is 3 or more times as long as a thickness.

* * * * *